Feb. 5, 1929.

A. LEDERER 1,700,942

APPARATUS FOR THE MANUFACTURE OF CARBON

Filed Aug. 14, 1925

INVENTOR
Anton Lederer
BY
Mayer, Hayfield & Watson
ATTORNEY

Patented Feb. 5, 1929.

1,700,942

UNITED STATES PATENT OFFICE.

ANTON LEDERER, OF VIENNA, AUSTRIA.

APPARATUS FOR THE MANUFACTURE OF CARBON.

Application filed August 14, 1925, Serial No. 50,282, and in Austria April 24, 1925.

This invention relates to apparatus for the manufacture of carbon; and more particularly to apparatus for the production of substantially pure carbon for use in the manufacture of carbon filaments of the crystalline variety to be used in incandescent electric lamps.

This invention has for its object generally to provide an improved apparatus which is efficient and durable and is adapted for a continuous high yield of substantially pure carbon.

A more specific object is to provide a reaction chamber adapted for the preparation of substantially pure carbon by the direct decomposition of relatively simple carbon compounds; also to provide a method of operating the same at relatively high temperatures without danger of deleterious reactions going on within the chamber that may contaminate the carbon.

The apparatus thus provided is adapted for the practice of the process of preparing carbon set forth in my application for Letters Patent of the United States, Serial No. 50,281, filed August 14, 1925.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

Figure 1:
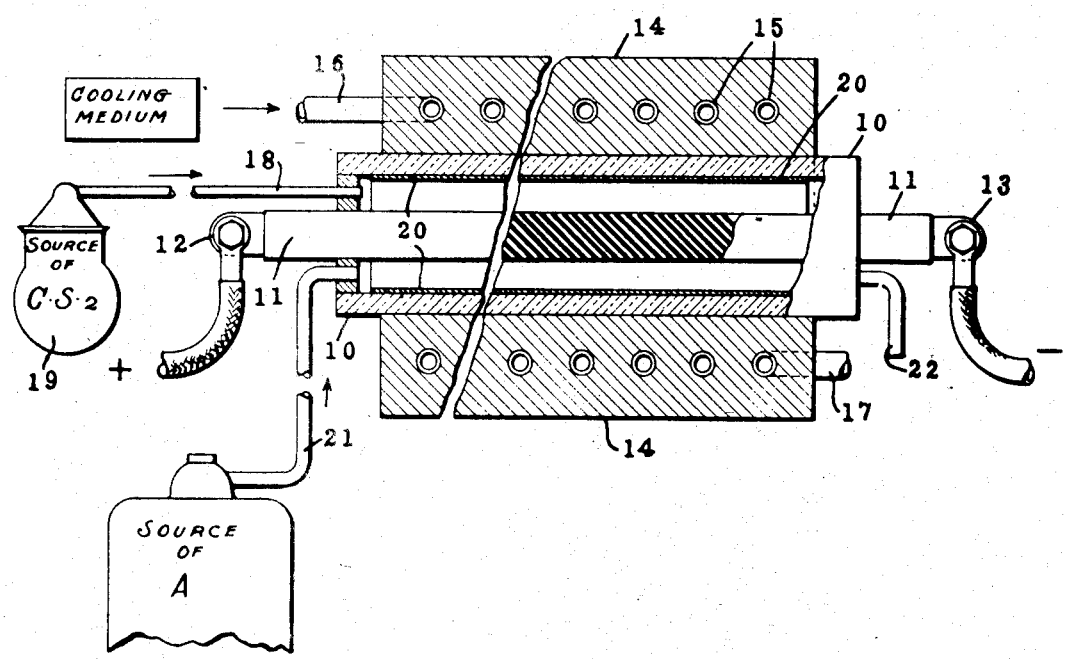
Figure 2:
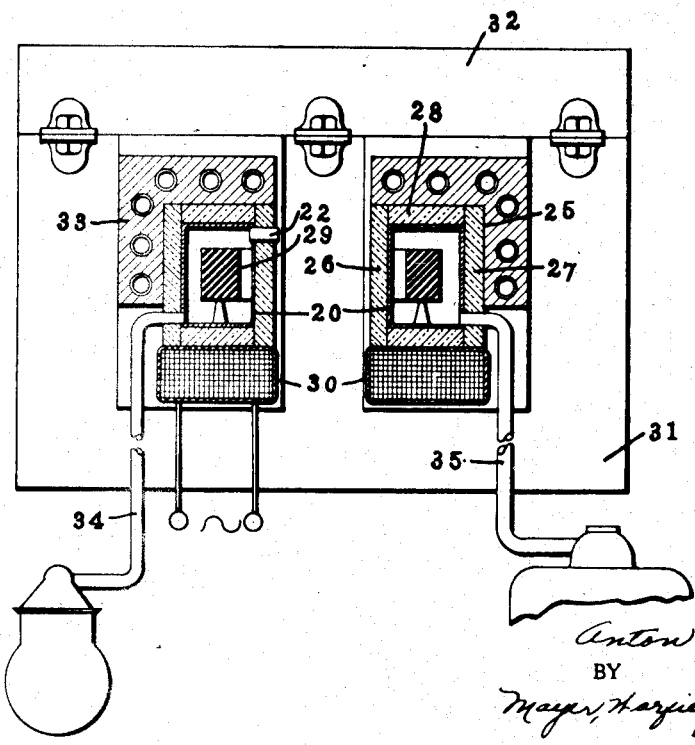

For a fuller understanding of the nature and objects of the invention reference should be had to the following detailed description taken in connection with the accompanying drawing, in which:

Figure 1 is a view, partly in section and partly in elevation, showing an arrangement of a reaction chamber arranged in accordance with the invention; and Fig. 2 is a similar view showing a modified arrangement of parts.

Referring now to the drawing, and particularly to Fig. 1, 10 indicates a tube of refractory material, for example, of porcelain or quartz, which comprises the reaction chamber proper. Disposed within the chamber is a carbon body whose presence is desired in order to induce the proper chemical reaction. This carbon body may, with convenience, also serve as the heating means. The carbon body is accordingly axially disposed within chamber 10 in the form of a resistance element 11 having terminals 12 and 13 connected with a suitable source of electric current.

The tube 10 is shown as surrounded by a cylindrical mass of heat-conducting material 14 which contains a helical passage 15 having an inlet 16 and an outlet 17 arranged for the circulation of a suitable cooling medium, for example, water. The reaction chamber thus provided is adapted for the direct decomposition of relatively simple inorganic carbon compounds or carboniferous vapors, such, for example as carbon bisulphide into the elemental constituents, carbon and sulphur. The reaction chamber is here indicated as provided with a passage 18 adapted to supply a stream of carbon bisulphide from any suitable source, for example, the retort shown at 19.

In order to avoid the danger that the carbon bisulphide, when passing through the glowing walls of the tube 10, may react therewith to form compounds which would deleteriously affect the purity of the carbon desired to the produced, the interior walls of the reaction chamber are surfaced with a layer of inert material 20, for example, platinum or carbon.

By means of the resistance element here provided, the reaction chamber may be heated to a temperature above the combining temperature of carbon and sulphur, thus causing the carbon bisulphide vapor, when it enters the heated zone of the reaction chamber, to decompose, the carbon finding its way to the heated surfaces where it is deposited while the sulphur vapors wander to the cooler surfaces. The carbon thus collects upon the resistance element 11, while the sulphur tends to collect on the inner walls of the chamber 10 which are cooled to or slightly below the temperature at which sulphur is deposited, but not to that at which condensation of carbon bisulphide vapors takes place.

In order substantially to avoid the deposition of sulphur on the inner walls of the chamber 10 and thereby avoid possible contamination of the carbon being produced, it is preferable to expel the sulphur vapors. This is readily accomplished by flushing the reaction chamber with gas, preferably an inert gas. This is accomplished in the apparatus indicated in the drawing by providing a passage 21, entering one end of the reaction chamber 10, leading from a source of argon gas; the gas thus introduced is permitted to exhaust from chamber 10 through the passage indicated at 22. A drop in gas pressure is thus provided across the reaction chamber which causes an outward flow of the sulphur vapors.

In operation the reaction chamber is first heated above the combining temperature of carbon and sulphur; the chamber being then in condition to receive a steady supply of carbon bisulphide vapors. Soon after the introduction of the carbon bisulphide vapors, the deposition of carbon will begin. This reaction will continue substantially as long as the necessary antecedent conditions are continued. The removal of sulphur vapors is accomplished substantially simultaneously by means of the flow of inert gas through the chamber. By this arrangement, a detrimental secondary reaction and the consequent contamination of the carbon produced are avoided, while separation of the products of the decomposition of carbon bisulphide vapors are easily and quickly accomplished. The carbon thus produced may be readily removed in a substantially pure condition, the operation being capable of substantially indefinite repetition.

It is obvious that the drop in temperature within the reaction chamber may be produced by heating certain parts of the interior in any suitable manner and simultaneously cooling down other parts of the reaction chamber to the desired lower limit of temperature.

In Fig. 2 a modified arrangement of apparatus is illustrated. Here the reaction chamber 25 is constructed in annular form having inner and outer walls 26 and 27 respectively, constructed of refractory material and their end walls 28 arranged to close the same and constructed of similar materials. Within the reaction chamber is disposed an annular carbon resistance element 29 which serves as the resistance element for heating the chamber 25, this element being arranged as a secondary of a transformer to be heated inductively from the primary winding 30; both primary and secondary are disposed about the central leg of the three-legged transformer core 31. This core is shown as provided with a removable yoke 32 to provide access for the assembly and disassembly of the reaction chamber. The outer and upper walls of the reaction chamber are surrounded by cooling envelope 33 constructed with cooling passages similar to that shown at 15 in Fig. 1. A passage 34 leading to the bottom of the reaction chamber is arranged to supply carbon bisulphide vapors, while a passage 35, shown at the other side of the drawings is similarly arranged to provide a source of inert gas for flushing purposes. In each of the arrangements here shown the resistance element is preferably of carbon so as to serve not only as the heating means but as a catalyzing agent as taught in my prior application.

Since certain changes in carrying out the above process and in the construction set forth, which embody the invention may be made without departing from its scope, it is intended that all matter contained in the above description or shown in the accompanying drawing shall be interpreted as illustrative and not in a limiting sense.

Having described my invention, what I claim as new and desire to secure by Letters Patent, is:

1. Apparatus for the production of substantially pure carbon by the direct decomposition of simple carboniferous vapors comprising, in combination, a refractory reaction chamber having means for admitting carboniferous vapors, a body disposed in said chamber adapted to have carbon deposited upon the same, means for causing said body to become heated above the combining temperature of the components of said vapor, means for cooling another portion of the chamber to a temperature below the vaporization temperature of the non-carbon component of said vapor, and a lining of inert material disposed interiorly of the cooled portions of said chamber whereby deleterious reactions between said non-carbon component and said cooled portions of said chamber are prevented.

2. Apparatus for the production of substantially pure carbon by the direct decomposition of simple carboniferous vapors comprising, in combination, a refractory reaction chamber having means for admitting carboniferous vapors, a carbon body disposed in said chamber and adapted to have carbon deposited upon the same, electric means adapted to cause said body to become heated above the combining temperature of the components of said carboniferous vapors, means for cooling at least a portion of the walls of said chamber to a temperature below the vaporization temperature of the non-carbon component of said vapor, and a lining of inert material disposed over the inner portion of said walls which are cooled whereby deleterious reactions between said non-carbon component and the chamber wall are prevented.

3. Apparatus for the production of substantially pure carbon by the direct decomposition of simple carboniferous vapors comprising, in combination, a refractory reaction chamber having means for admitting carboniferous vapors, a carbon resistor disposed in said chamber and adapted to have a carbon precipitate deposited thereon, means for supplying electric current to said carbon resistor for heating the same to a temperature above the combining temperature of the components of said carboniferous vapor, a cooling envelope disposed about an outer wall of said reaction chamber in heat-conducting relation thereto for cooling the same below the vaporization temperature of the non-carbon component of said carboniferous vapor, and means for flushing said chamber with an inert gas.

4. Apparatus for the production of substantially pure carbon by the direct decomposition of carbon bisulphide vapors comprising, in combination, a refractory reaction chamber having means for admitting carbon bisulphide vapors, a carbon resistor disposed centrally in said reaction chamber and adapted to have a carbon precipitate deposited thereon, means for supplying electric current to heat said carbon resistor to a temperature above the combining temperature of carbon and sulphur, and a cooling envelope disposed exteriorly of and in heat-conducting relation with the wall of said reaction chamber and adapted to cool at least a portion of the interior thereof to a temperature below the vaporization temperature of sulphur whereby the sulphur is deposited thereon without contaminating the carbon deposit.

5. Apparatus for the production of substantially pure carbon by the direct decomposition of carbon disulphide vapors comprising, in combination, a refractory reaction chamber having means for admitting carbon bisulphide vapors, a carbon resistor element disposed centrally in said chamber and adapted to receive a carbon deposit thereon, means for supplying electric current to said resistor to heat the same above the combining temperature of carbon and sulphur, a cooling coil disposed exteriorly of the wall of said reaction chamber and in heat-conducting relation therewith whereby at least a portion of the interior wall of said chamber is cooled to a temperature below the vaporization temperature of sulphur, and means for fluishing said chamber with an inert gas.

In testimony whereof I affix my signature.

ANTON LEDERER.